United States Patent [19]

Yamaguchi et al.

[11] Patent Number: 5,374,001
[45] Date of Patent: Dec. 20, 1994

[54] REVERSE ROTATION PREVENTING MECHANISM IN SPINNING REEL FOR FISHING

[75] Inventors: Nobuyuki Yamaguchi; Kazuo Hirano, both of Tokyo, Japan

[73] Assignee: Daiwa Seiko, Inc., Tokyo, Japan

[21] Appl. No.: 39,682

[22] Filed: Jan. 21, 1993

Related U.S. Application Data

[63] Continuation of Ser. No. 645,708, Jan. 25, 1991, abandoned.

[30] Foreign Application Priority Data

Feb. 2, 1990 [JP] Japan ................................. 2-9726
Apr. 26, 1990 [JP] Japan ................................. 2-44979

[51] Int. Cl.$^5$ ................................................. A01K 89/02
[52] U.S. Cl. ................................... 242/247; 242/299
[58] Field of Search ............... 242/247, 248, 298, 243, 242/295, 299

[56] References Cited

U.S. PATENT DOCUMENTS

| | | |
|---|---|---|
| 2,604,273 | 7/1952 | Hayes . |
| 3,146,966 | 9/1964 | Dunn ........................ 242/298 X |
| 4,422,600 | 12/1983 | Preston ..................... 242/298 X |
| 4,515,325 | 5/1985 | Ito ............................... 242/295 |
| 4,529,142 | 7/1985 | Yoshikawa .................... 242/243 |
| 4,881,699 | 11/1989 | Emura ........................... 242/248 |
| 5,020,738 | 6/1991 | Yamaguchi ................. 242/247 X |

FOREIGN PATENT DOCUMENTS

| | | |
|---|---|---|
| 908659 | 4/1946 | France . |
| 53796 | 9/1946 | France . |
| 951895 | 11/1956 | Germany . |
| 954831 | 12/1956 | Germany . |
| 55-17824 | 4/1980 | Japan . |
| 57-56710 | 12/1982 | Japan . |
| 64-038963 | 3/1989 | Japan . |

*Primary Examiner*—Daniel P. Stodola
*Assistant Examiner*—Eileen A. Dunn
*Attorney, Agent, or Firm*—Longacre & White

[57] ABSTRACT

A reverse rotation preventing mechanism in a spinning reel for fishing is characterized in that a rotor is secured to a rotary quill, which is rotated by the turning of a handle in kinematic conjunction therewith; a reverse rotation prevention member having reverse rotation prevention engagement portions is rotatably supported concentrically to the quill; a reverse rotation prevention claw is supported by the body of the reel so as to be swingable, and can be engaged with one of engagement portions; and a roller-type one-way clutch is provided between the rotor and the reverse rotation prevention member. When the rotor is reversely rotated in such a direction as to wind a fishline, the clutch member connects kinematically the rotor to the reverse rotation prevention member.

11 Claims, 9 Drawing Sheets

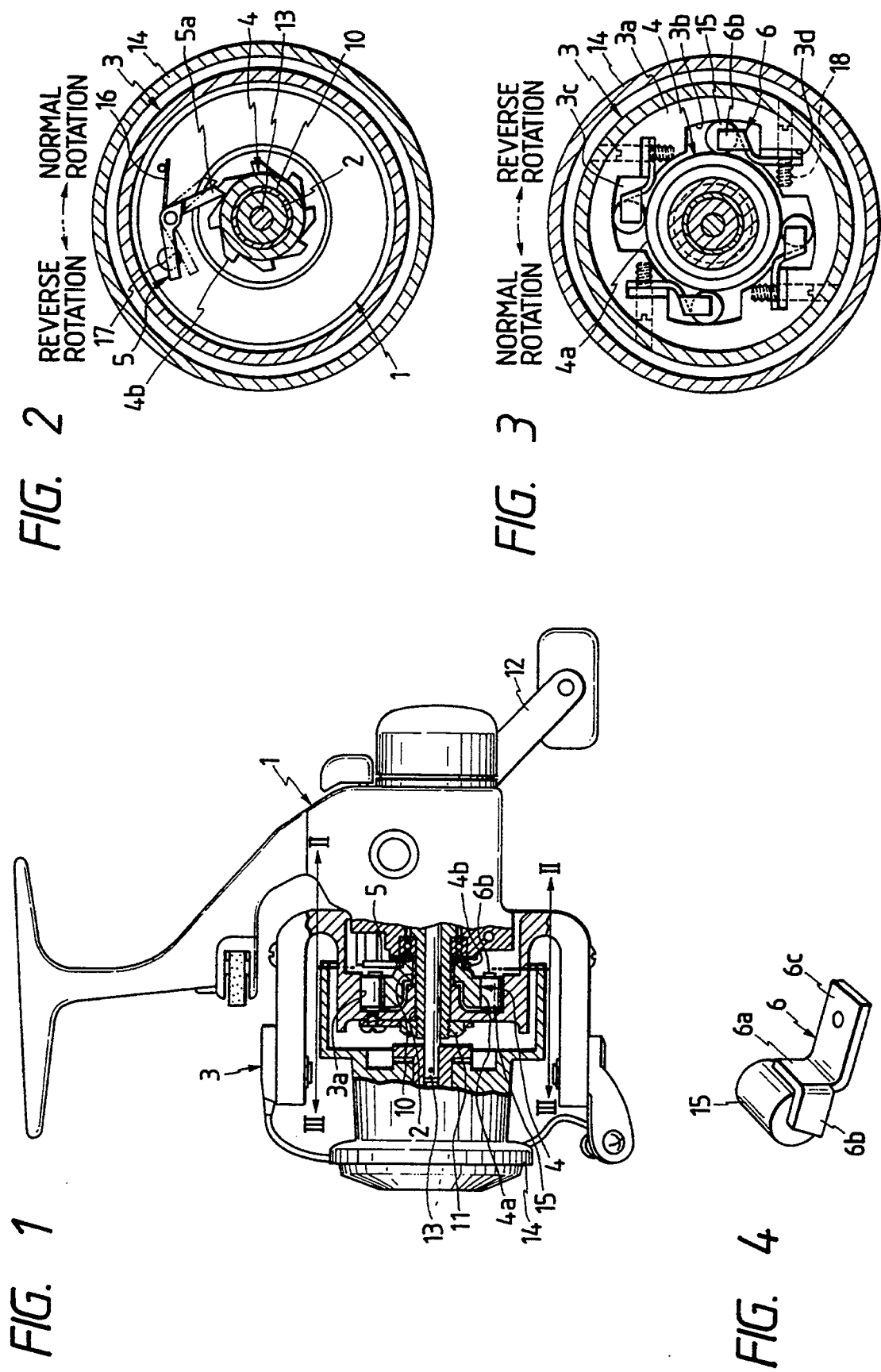

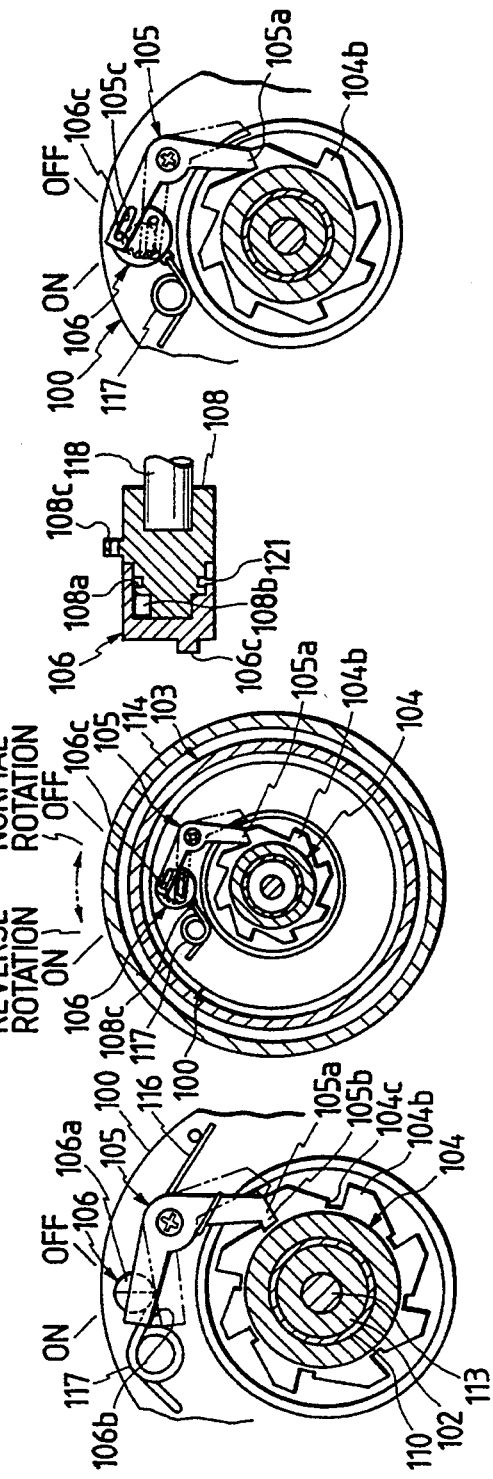
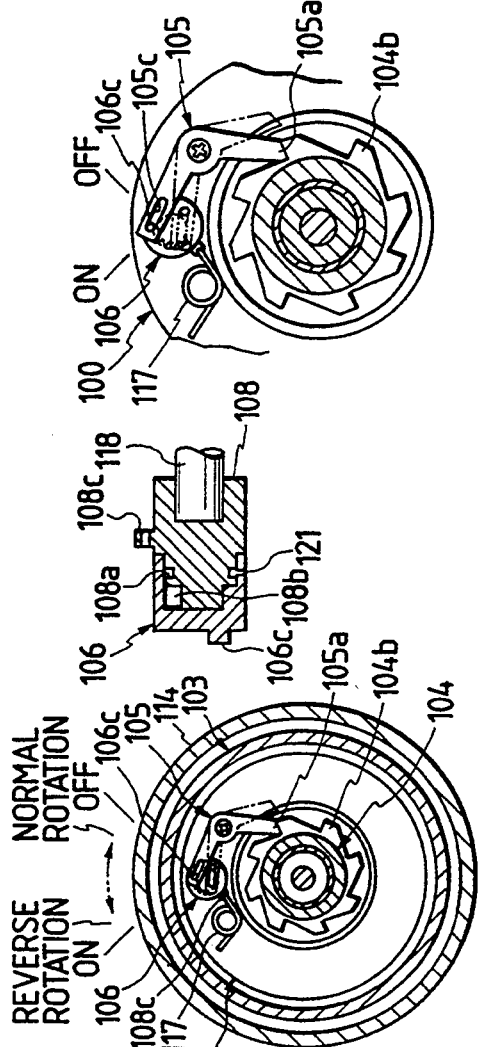
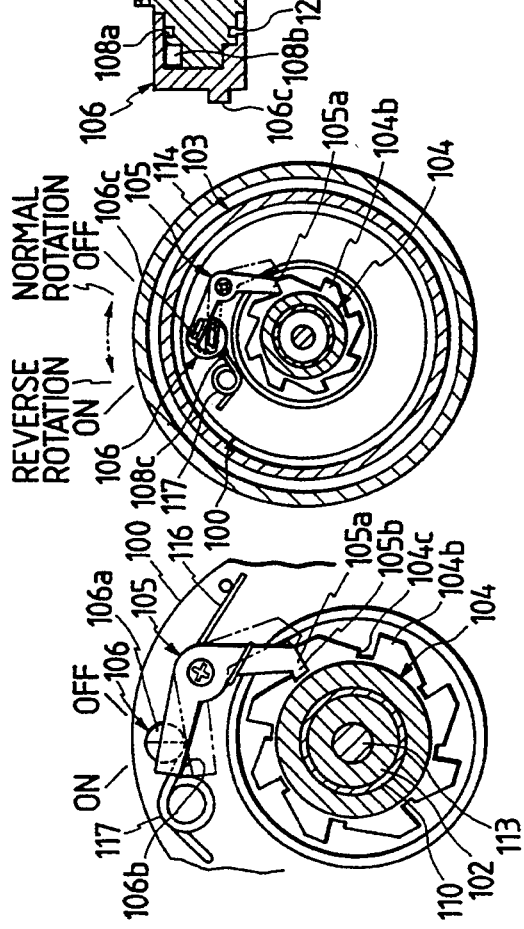
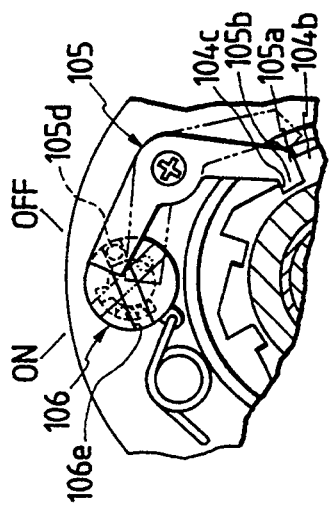
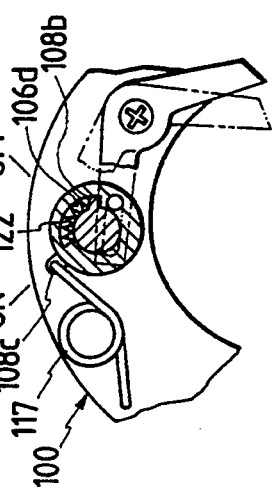
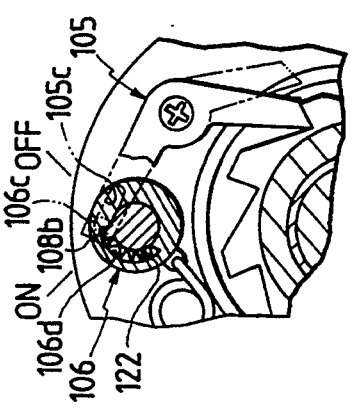

NORMAL ROTATION ←--→ REVERSE ROTATION

REVERSE ROTATION PREVENTING MECHANISM IN SPINNING REEL FOR FISHING

This is a continuation of application Ser. No. 07/645,708, filed Jan. 25, 1991, which was abandoned upon the filing hereof.

BACKGROUND OF THE INVENTION

The present device relates to a reverse rotation prevention mechanism which is in a spinning reel for fishing and includes a roller-type clutch.

Although the reverse rotation of a ratchet is conventionally prevented by a reverse rotation prevention claw engaged with the ratchet, there is a problem that since the number of the teeth of the ratchet is small, the angle of the play of the ratchet until the completion of the prevention of the reverse rotation thereof is too large to quickly prevent the reverse rotation by engaging the claw with the ratchet.

To solve the problem, a reverse rotation prevention mechanism in which a roller-type one-way clutch is fitted in a ratchet not to rotate relative thereto and the rollers of the clutch are fitted in the peripheral portion of a rotary quill to make it possible to prevent the reverse rotation of o the ratchet with less play thereof until the completion of the prevention was proposed as disclosed in the Japan Utility Model Application (OPI) No. 38963/89 (the term "OPI" as used herein means an "unexamined published application").

However, since the diameter of the rotary quill in which the rollers of the roller-type one-way clutch of the mechanism disclosed in the Japan Utility Model Application mentioned above are fitted is small, the circumferential velocity of the roller contact surface of the quill is so low that there is a problem that the rollers are not instantaneously and surely pinched between the quill and the ratchet to prevent the reverse rotation thereof. Besides, since the engagement surfaces of the components of the mechanism are likely robe locally loaded in the engagement of the components for the prevention of the reverse rotation of the ratchet so as to be deformed, there is a problem that the durability of the mechanism is low. In addition, since the roller-type one-way-clutch is a generally purchasable one, the inside and outside diameters thereof are limited so as to lower the degree of freedom of design of the mechanism to cause a problem that the mechanism is not appropriate to a compact reel.

Further, since there is a resistance to the rotation of the roller-type one-way clutch itself in the direction for the disengagement thereof and the rotation speed of the rotor of the spinning reel or that of the spool of a reel whose spool shaft is supported at both the ends thereof has an influence, the ratchet is rotated in kinematic conjunction with the rotation of the rotor or the spool in the direction for the winding of the fishline so as to move the claw out of the position of the engagement with the ratchet to make it impossible to instantaneously prevent the reverse rotation of the rotor of the spool.

SUMMARY OF THE INVENTION

The present device was made in order to solve the problems mentioned above. Accordingly, it is an object of the device to provide a reverse rotation prevention mechanism which is for a spinning reel for fishing and is such that the reverse rotation of the rotor of the reel is instantaneously and surely prevented by the mechanism, the durability of the mechanism is high, the dimensions of the mechanism are not much restricted, the degree of freedom of design of the mechanism is high, and the mechanism is appropriate to a compact reel as well.

In the reverse rotation prevention mechanism provided in accordance with the present invention, the rotor is secured to a rotary quill, which is rotated by the turning of a handle in kinematic conjunction therewith, a reverse rotation prevention member having reverse rotation prevention engagement portions is rotatably supported concentrically to the quill, a reverse rotation prevention claw is supported by the body of the reel so as to be swingable and is urged by a spring so as to be capable of being engaged with one of the engagement portions, and a roller-type clutch is provided between the rotor and the reverse rotation prevention member so as to kinematically connect the rotor and the member to each other when the rotor is reversely rotated in such a direction as to unwind a fishline.

BRIEF DESCRIPTION OF THE DRAWINGS

FIG. 1 is a partially sectional side view of a spinning reel which is for fishing and provided with a reverse rotation prevention mechanism which is a first embodiment of the present device;

FIG. 2 is an enlarged sectional view of the reel along a line II—II shown in FIG. 1;

FIG. 3 is an enlarged sectional view of the reel along a line III—III shown in FIG. 1;

FIG. 4 is a perspective view of the spring of the mechanisms;

FIG. 15 is an enlarged sectional view of a major part of the mechanism;

FIG. 16 is a sectional view of a reverse rotation prevention mechanism which is a sixth embodiment of the present device and is for a spinning reel for fishing, along a line corresponding to that XIII—XIII shown in FIG. 12, in the state that an engagement claw is engaged with a ratchet;

FIG. 17 is a sectional view of a the cam member of the mechanism shown in FIG. 16;

FIGS. 18 and 19 are enlarged sectional views of a major part of the mechanism shown in FIG. 16;

FIG. 20 is a sectional view of the major part in the state that the claw is disengaged from the ratchet;

FIG. 21 is a sectional view of a major part of a reverse rotation prevention mechanism which is an alternate embodiment of the mechanism shown in FIG. 16;

DETAILED DESCRIPTION OF THE PREFERRED EMBODIMENT

Figure 5:
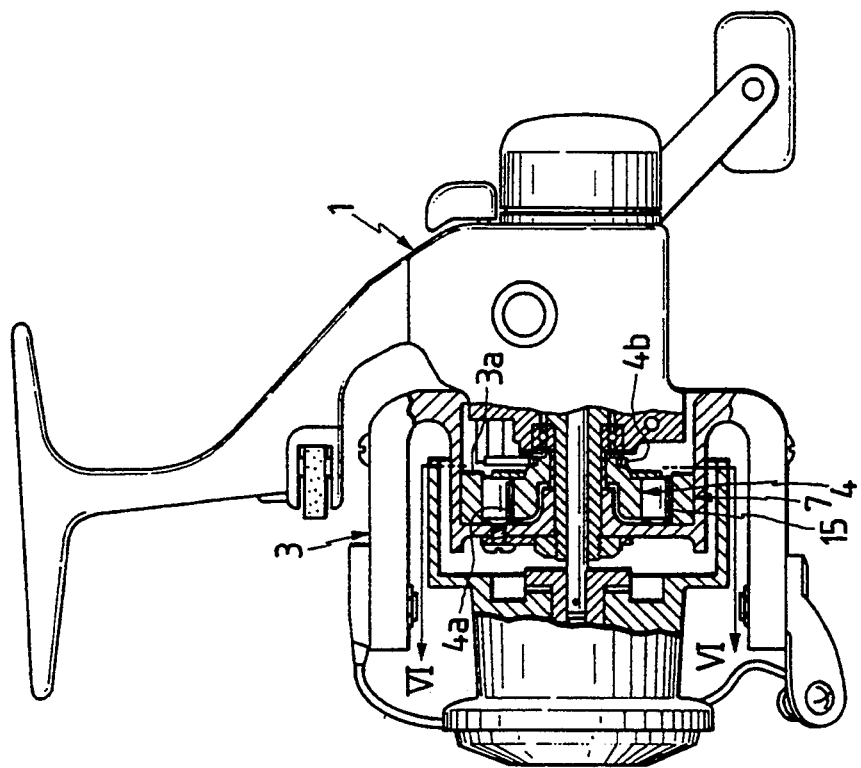
FIG. 5 is a partially sectional side view of a spinning reel which is for fishing and provided with a reverse rotation prevention mechanism which is a second embodiment of the invention.

Embodiments of the present device are hereafter described with reference to the drawings attached hereto.

FIGS. 1, 2, 3 and 4 show a reverse rotation prevention mechanism which is the first embodiment and is for a spinning reel for fishing. In the reel, a ring 10 is fitted on a rotary quill 2 projecting forward from the body 1 of the reel, and a rotor 3 is fitted on the quill in front of the ring and secured to the quill by a nut 11, as shown in FIG. 1, so that the rotor is rotated by the turning of a handle 12 in kinematic conjunction therewith. A spool 14 is supported on the front end portion of a spool shaft 13 fitted in the rotary quill 2 and projecting therefrom, so that the spool is reciprocated backward and forward by the turning of the handle 12 in kinematic conjunction therewith.

A reverse rotation prevention member 4 is rotatably supported on the ring 10, and includes a perfectly circular portion 4a on which a plurality of rollers 15 are provided, and a plurality of reverse rotation prevention engagement portions 4b. The tip portion 5a of a reverse rotation prevention claw 5 is located near the reverse rotation prevention engagement portions 4b of the member 4 so that the tip portion can be engaged with one of the engagement portions, as shown in FIG. 2. The claw 5 is supported by the body 1 of the reel so that the claw can be swung. A spring 16 urges the claw 5 in such a direction as to engage the tip portion 5a thereof with one of the rotation prevention engagement portions 4b. The position of the claw 5 is controlled by a cam member 17 so that the tip portion 5a of the claw is engaged with or disengaged from the engagement portion 4b.

The rotor 3 has an annular projection 3a extending in the rear recess of the rotor and having a plurality of recesses 3c having bottoms 3b extending nearly in the circumferential direction of the rotor and slightly outward in the direction of the reverse rotation of the rotor, as shown in FIG. 3. The rollers 15 are provided in the recesses 3c and urged by springs 6 counterclockwise with regard to FIG. 3. Each of the springs 6 includes pushing portion 6a for pushing the roller 15 on the outside circumferential surface thereof, a coming-off prevention portion 6b located in contact with the end face of the rotor to prevent it from coming off, and a secured portion 6c, as shown in FIG. 4. The secured portion 6c is fitted in the groove 3d of the annular projection 3a of the rotor 3 and secured thereto by a screw 18.

The roller-type clutch of the reverse rotation prevention mechanism includes the reverse rotation prevention member 4, the recesses 3c, the rollers 15, and the springs 6. When the handle 12 is turned in such a direction that a fishline not shown in the drawings is wound on the spool 14, the rotor 3 is rotated clockwise with regard to FIG. 2 and the rotary quill 2 and the rotor are rotated counterclockwise with regard to FIG. 3. At that time, the rollers 15 are rotated in the recesses 3c so that the rotor 3 and the reverse rotation prevention member 4 are not kinematically connected to each other. For that reason, the member 4 engaged at the engagement portion 4b thereof with the tip portion 5a of the reverse rotation prevention claw 5 as shown in FIG. 2 is not rotated. When the fishline wound on the spool 14 is then unwound therefrom by the pull of a fish, the rotor 3 is reversely rotated counterclockwise with regard to FIG. 2 or clockwise with regard to FIG. 3. At that time, because of the reverse rotation of the rotor 3, each of the rollers 15 is pinched between the perfectly circular portion 4a of the reverse rotation prevention member 4 and the bottom 3b of the recess 3c of the rotor so that the rotor and the member are kinematically connected to each other to transmit the torque of the rotor to the member to rotate it in the same direction as the rotor However, since the engagement portion 4b of the member 4 is already engaged with the tip portion 5a of the reverse rotation prevention claw 5 as shown in FIG. 2, the member cannot be rotated, namely, the rotor 3 cannot be reversely rotated any more. If the claw 5 is swung counterclockwise by the cam member 17 against the urging force of the spring 16 in advance, as shown by a two dot chain line in FIG 2, so that the tip portion 5a of the claw is disengaged from the engagement portion 4b of the member 4, the rotor 3 and the member can be reversely rotated continuously.

Since the perfectly circular portion 4a of the reverse rotation prevention member 4 is large in diameter, the circumferential velocity of the roller contact surface of the portion is high enough to immediately prevent the reverse rotation of the rotor 3 and reverse rotation prevention mechanism is high in durability. Since the mechanism is not much restricted of the dimensions thereof, the mechanism is high in the degree of freedom of design. Therefore, the mechanism is appropriate to a compact reel as well.

Figure 6:
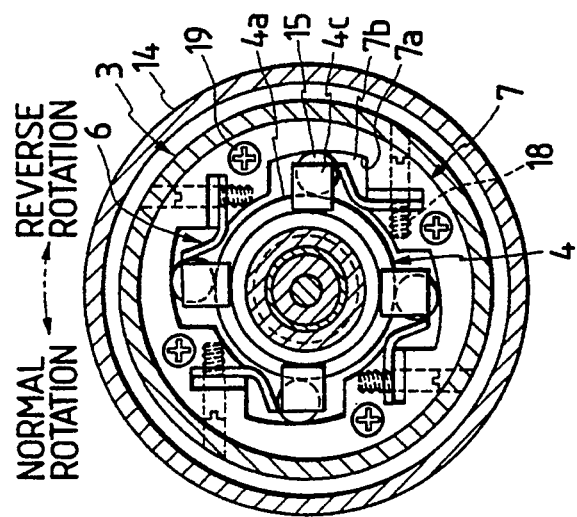
FIG. 6 is an enlarged sectional view of the reel along a line VI—VI shown in FIG. 5.

FIGS. 5 and 6 show a reverse rotation prevention mechanism which is a modification of the embodiment described above. In the modification, a rotor 3 has an annular projection 3a formed separately from the body of the rotor. A ring 7 of the same form as the annular projection 3a is secured to the rotor 3 by a plurality of screws 19. A reverse rotation prevention member 4 includes a perfectly circular portion 4a on which a plurality of rollers 15 are provided, a plurality of reverse rotation prevention engagement portions 4b, and a plurality of roller coming-off prevention portions 4c for preventing the rollers from coming off. Springs 6 have no roller coming-off prevention portion. The ring 7 has a plurality of recesses 7b having bottoms 7a extending nearly in the circumferential direction of the ring and slightly outward in the direction of the reverse rotation of the rotor 3. The springs 6 and the roller coming-off prevention portions 4c in the embodiment and the modification may be otherwise shaped and secured. The modification is the same in operation and effect as the embodiment.

Figure 8:
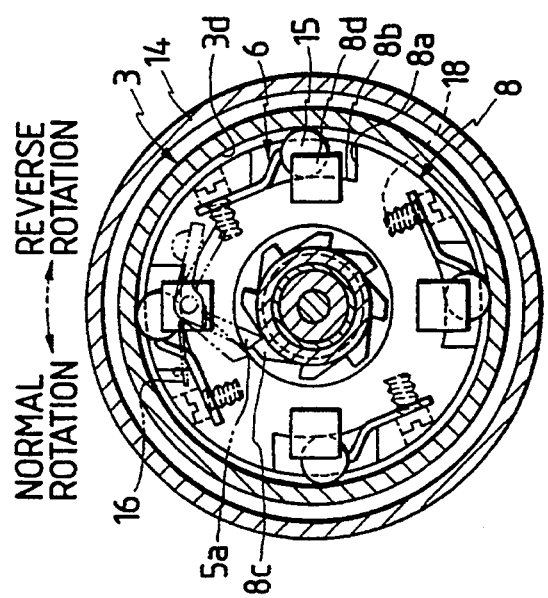
FIG. 8 is an enlarged sectional view of the reel along line VIII—VIII shown in FIG. 7.
Figure 7:
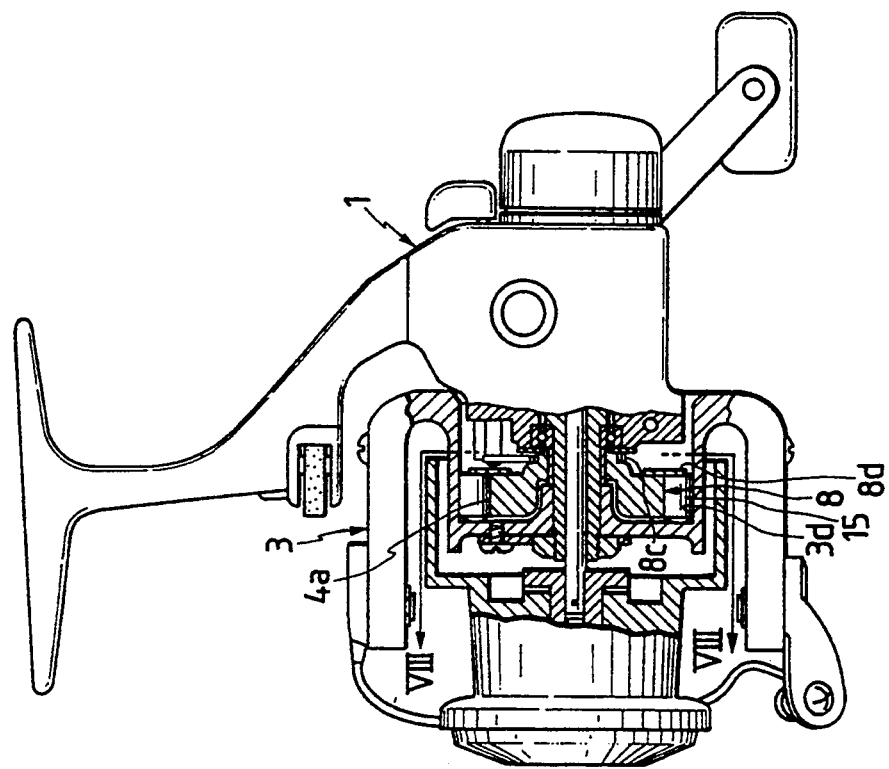
FIG. 7 is a partially sectional side view of a spinning reel which is for fishing and provided with a reverse rotation prevention mechanism which is a third embodiment of the present device.

FIGS. 7 and 8 show a reverse rotation prevention mechanism which is the second embodiment and is for a spinning reel for fishing. In the reel, a rotor 3 is not provided with an annular projection and a ring such as those 3a and 7 in the preceding embodiment, and a reverse rotation prevention member 8 has recesses 8a in which rollers 15 are provided and which have bottoms 8b extending nearly in the circumferential direction of the member and slightly outward in the direction of the reverse rotation of the rotor. The member 8 further includes a plurality of reverse rotation prevention engagement portions 8c, and coming-off prevention portions 8d. The rollers 15 are provided in the recesses 8a of the member 8 and located in contact with the inside circumferential surface 3d of the rotor 3, which extends around the recess of the rotor. Springs for pushing the rollers 15 may be either provided or not provided. As shown in FIG. 8, the tip portion 5a of a reverse rotation prevention claw 5a is located near the engagement portions 8c of the reverse rotation prevention men, bet 8 so that the tip portion can be engaged with one of the engagement portions. The claw 5 is supported by the body 1 of the reel so that the claw can be swung. A spring 16 urges the claw 5 in such a direction as to engage the tip portion 5a thereof with one of the engagement portions 8c.

When the handle 12 of the reel shown in FIGS. 7 and 8 is turned in such a direction that a fishline not shown in the drawings is wound on a spool 14, the rotor 3 is rotated counterclockwise with regard to FIG. 8. At that time, the rollers 15 are rotated in the recesses 8a of the reverse rotation prevention member 8 so that the rotor 3 and the member are not kinematically connected to each other. For that reason, the member 8 engaged at the engagement portion 8c thereof with the tip portion 5a of the reverse rotation prevention claw 5 is not rotated. When the fishline wound on the spool 14 is then unwound therefrom by the pull of a fish, the rotor 3 is reversely rotated clockwise with regard to FIG. 8. At that time, because of the reverse rotation of the rotor 3, each of the rollers 15 is pinched between the inside circumferential surface 3d of the rotor and the bottom 8b of the recess 8a of the member 8 so that the rotor and the member are kinematically connected to each other to transmit the torque of the rotor to the member to rotate it in the same direction as the rotor. However, since the engagement portion 8c of the member 8 is already engaged with the tip portion 5a of the claw 5 as shown in FIG. 8, the member cannot be rotated, namely, the rotor 3 cannot be reversely rotated any more.

Figure 10:
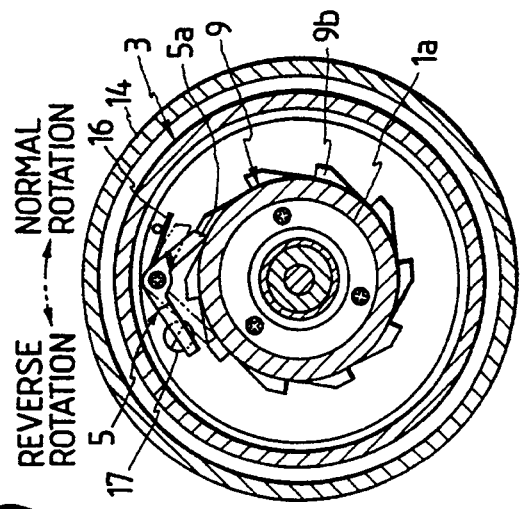
FIG. 10 is an enlarged sectional view of the reel along a line X—X shown in FIG. 9.
Figure 11:
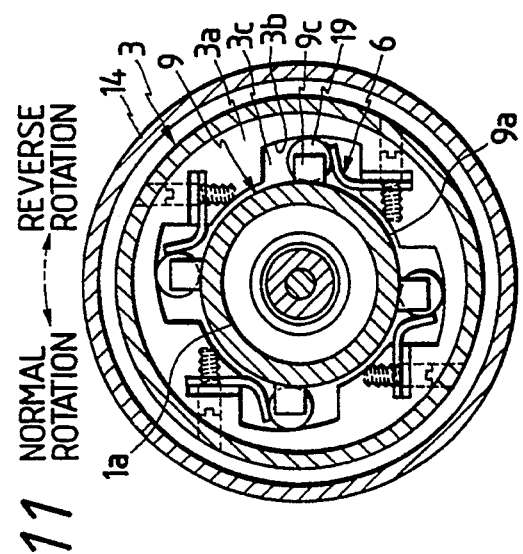
FIG. 11 is an enlarged sectional view of the reel along a line XI—XI shown in FIG. 9.
Figure 9:
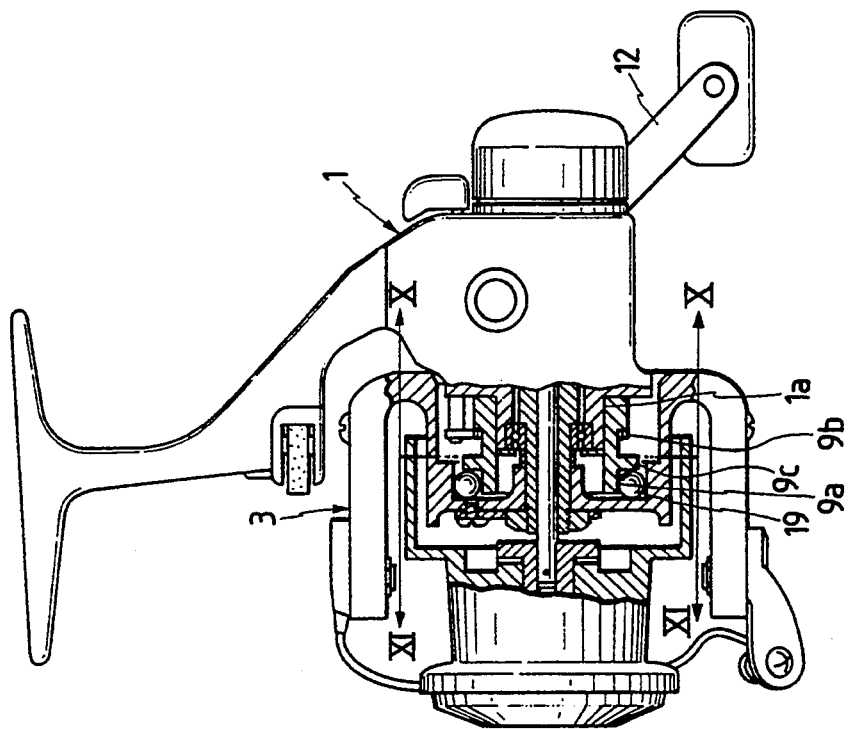
FIG. 9 is a partially sectional side view of a spinning reel which is for fishing and provided with a reverse rotation prevention mechanism which is a fourth embodiment of the present device.

FIGS. 9, 10 and 11 show a reverse rotation prevention mechanism which is the third embodiment and is for a spinning reel for fishing. In the reel, a rotor 3 has annular projection 3a of the same form as that shown in FIGS. 1 and 3, and a reverse rotation prevention member 9 is rotatably supported on the outside circumferential surface of a cylindrical portion 1a projecting forward from the body 1 of the reel, and includes a perfectly circular portion 9a on which balls 19 are provided, a plurality of reverse rotation prevention engagement portions 9b, and ball coming-off prevention portions 9c located in contact with the spherical surfaces of the balls to prevent them from coming off. As shown in FIG. 10, the tip portion 5a of a reverse rotation prevention claw 5 is located near the reverse rotation prevention portions 9b of the member 9 so that the tip portion can be engaged with one of the reverse rotation prevention portions. The claw 5 is supported by the body 1 of the reel so that the claw can be swung. A spring 16 urges the claw 5 in such a direction as to engage the tip portion 5a thereof with the engagement portion 9b of the member 9. The position of the claw 5 is controlled by a cam member 17 so that the tip portion 5a of the claw 5 is engaged with or disengaged from the engagement portion 9b of the member 9. The rotor 3 has the annular projection 3a formed in the rear recess of the rotor and having a plurality of recesses 3c having bottoms 3b extending nearly in the circumferential direction of the projection and slightly outward in the direction of the reverse rotation of the rotor, as shown in FIG. 11. The balls 19 are provided in the recesses 6c. Springs 6 urge the balls 19 counterclockwise with regard to FIG. 11.

When the handle 12 of the reel shown in FIGS. 9, 10 and 11 is turned in such a direction that a fishline not shown in the drawings is wound on a spool 14, the rotor 3 is rotated clockwise with regard to FIG. 10 and a rotary quill 2 and the rotor are rotated counterclockwise with regard to FIG. 11. At that time, the balls 19 are rotated in the recesses 3c so that the rotor 3 and the reverse rotation prevention member 9 are not kinematically connected to each other. For that reason, the member 9 engaged at the engagement portion 9b thereof with the tip portion 5a of the claw 5 as shown in FIG. 10 is not rotated. When the fishline wound on the spool 14 is then unwound therefrom by the pull of a fish, the rotor 3 is reversely rotated counterclockwise with regard to FIG. 10 or clockwise with regard to FIG. 11. At that time, because of the reverse rotation of the rotor 3, each of the balls 19 is pinched between the perfectly circular portion 9a of the member 9 and the bottom 3b of the recess 3c so that the rotor and the member are kinematically connected to each other to transmit the torque of the rotor to the member to rotate it in the same direction as the rotor. However, since the engagement portion 9b of the member 9 is already engaged with the tip portion 5a of the claw 5 as shown in FIG. 10, the member cannot be rotated, namely, the rotor cannot be reversely-rotated any more. If the claw 5 is swung counterclockwise against the urging force of the spring 16 in advance as shown by a two-dot chain line in FIG. 10, the rotor 3c can be reversely rotated continuously.

FIGS. 12, 13, 14, 15 and 16 show a reverse rotation prevention mechanism which is the fourth embodiment and is in a spinning reel for fishing.

Figure 13:
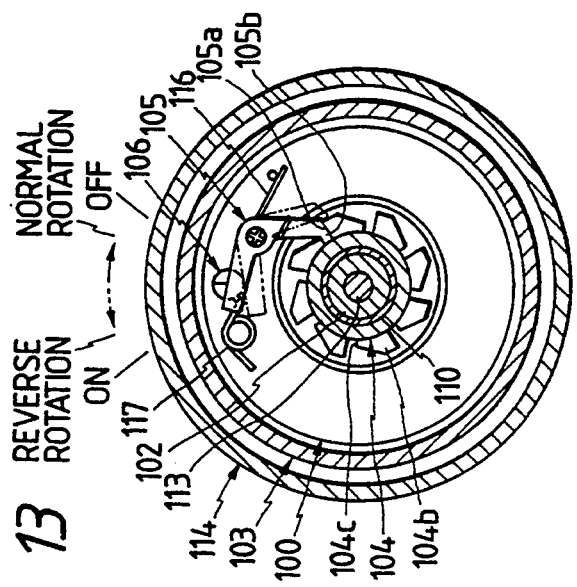
FIG. 13 is a sectional view of the mechanism along a line XIII—XIII shown in FIG. 12, in the state that an engagement claw is engaged with a ratchet.
Figure 14:
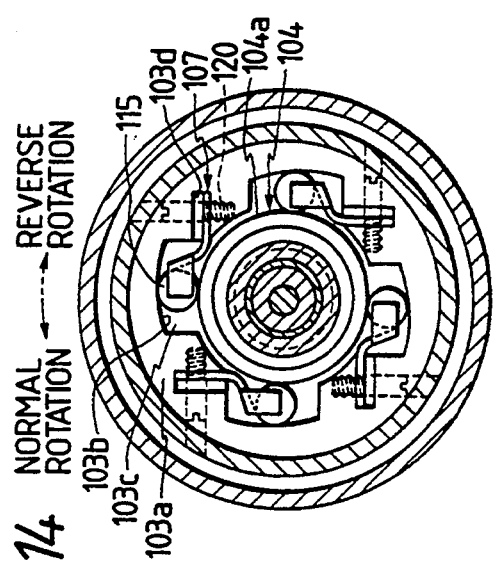
FIG. 14 is a sectional view of the mechanism along a line XIV—XIV shown in FIG. 12.
Figure 12:
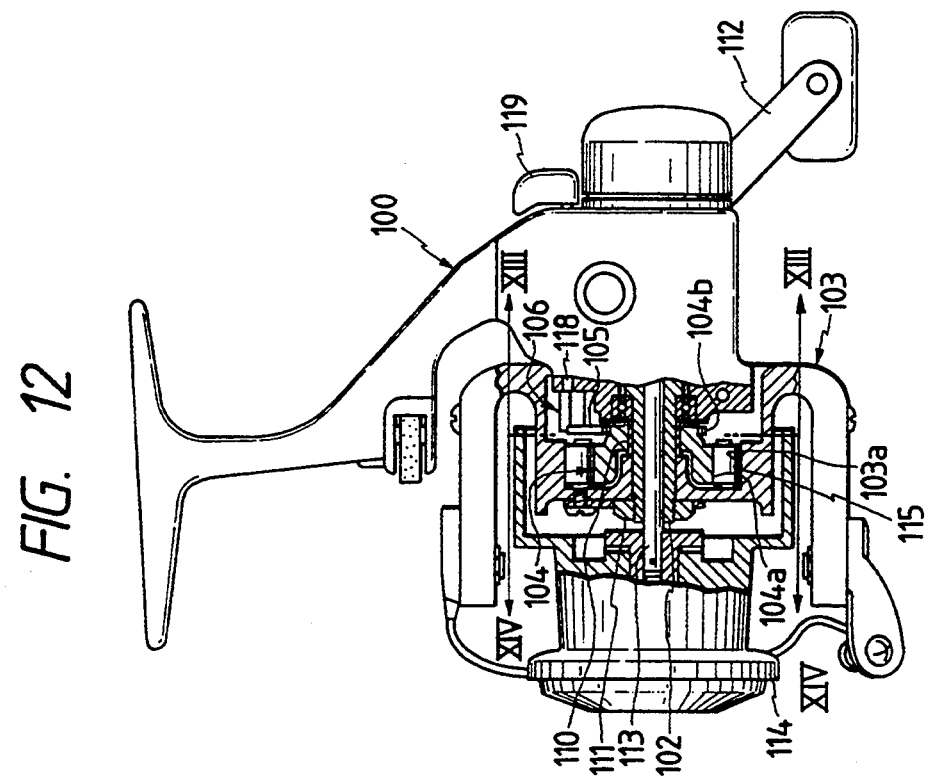
FIG. 12 is a partially sectional side view of a spinning reel which is for fishing and provided with a reverse rotation prevention mechanism which is a fifth embodiment of the present device.

In this embodiment, the position of the claw 105 is controlled by a cam 6a of cam member 106 so that the claw can be engaged with or disengaged from the ratchet 104b. A torsion spring 117 is provided between the body 101 of the reel and the spring engagement part 106*b* of the cam member 106. The cam member 106 is secured to a manipulation bar 118 at the front end portion thereof. A knob 119 is secured to the bar 118 at its rear portion projecting from the rear of the reel body 101. FIGS. 13 and 15 show the state that the knob 119 is swung into an engagement position ("ON" position) to engage the engagement portion 105*b* of the claw 105 in the notch 104*c* of the ratchet 104*b*.

Since the resistance acts to the rotation of the roller-type one-way clutch in the direction for the disengagement thereof and the rotation speed of the rotor has the influence, the ratchet 104*b* would be likely to be rotted in kinematic conjunction with the rotation of the rotor 103 in the direction of the winding of the fishline. However, in the reverse rotation prevention mechanism, the ratchet 104*b* has the notches 104*c*, the claw 105 has the engagement portion 105*b* to be engaged in the notch, and the notch, the engagement portion and the spring 116 constitute the means for preventing the claw from being disengaged from the ratchet, the rotary member 104 and the ratchet thereof are prevent from being rotated in kinematic conjunction with the rotation of the rotor 103 in the direction of the winding of the fishline. For that reason, the rotor 103 and the rotary member 104 are instantaneously prevented from being reversely rotated.

FIGS. 16, 17, 18, 19 and 20 show a reverse rotation prevention mechanism which is the fifth embodiment and is for a spinning reel for fishing. The mechanism includes a deformed cam member 106 for manipulating a reverse rotation prevention engagement claw 105, but does not include a member such as the spring 116 of the preceding embodiment. The ratchet 104*b* of the rotary member 104 of the mechanism does not have notches such as those of the preceding embodiment. The claw 105 does not have an engagement portion which is a stepped portion, at the tip portion 105*a* of the claw. The cam member 106 is fitted on a secured member 108 secured to a manipulation bar 118, so that the cam member can be swung. A screw 121 is engaged in the cam member 106 and fitted in the groove 108*a* of the secured member 108 to prevent the cam member from coming off the secured member. The cam member 106 is formed with a pin 6*c* put in the slender hole 5*c* of the claw 105. When a knob 119 is in an engagement position ("ON" position), the pin 106*c* is located slightly rightward from a vertical line with regard to FIG. 16. A projection 108*b* is provided on the outside circumferential surface of the front end portion of the secured member 108 and fitted in the arc-shaped recess 106*d* of the cam member 106. A spring 122 is provided between the projection 108*b* and the cam member 106, and urges the cam member. The secured member 108 has a spring engagement portion 108*c* with which a torsion spring 117 is engaged.

When the handle 112 of the reel shown in FIGS. 16, 17, 18, 19 and 20 is turned in such a direction that a fishline not shown in the drawings is wound on a spool 114, the rotor 103 is rotated counterclockwise with regard to FIG. 16, 17, 18 and 19. At that time, the rollers 115 are rotated in the recesses 103*c* so that the rotor 103 and the rotary member 104 are not kinematically connected to each other, in the same manner as preceding embodiment. Since the pin 106*c* put in the slender hole 105*c* of the claw 105 is located slightly rightward from the vertical line with regard to FIG. 16 so that the tip portion 105*a* of the claw is pushed on the ratchet 104*b*, the rotary member 104 is not rotated. Since there is a resistance to the rotation of the roller-type one-way clutch of the reverse rotation prevention mechanism in the direction for the disengagement of the clutch and the rotation speed of the rotor 103 has an influence, the ratchet 104*b* would be likely to be rotated in kinematic conjunction with the rotation of the rotor in the direction of the winding of the fishline. However, since the pin 106*c* in the slender hole 105*c* of the claw 105 is located slightly rightward from the vertical line with regard to FIG. 16, the cam member 106 and the claw are not swung, so that a means for preventing the claw from being disengaged from the ratchet 104*b* acts to surely keep the rotary member 104 from being rotated in kinematic conjunction with the rotation of the rotor 103 in the direction for the winding of the fishline. When the fishline wound on the spool 114 is then unwound therefrom by the pull of a fish, the rotor 103 is reversely rotated counterclockwise with regard to FIG. 16. Because of the reverse rotation of the rotor 103, each of the rollers 115 is pinched between the bottom of the recess 103*c* and the perfectly circular portion 104*c* of the rotary member 104 so that the rotor and the member are kinematically connected to each other to transmit the torque of the rotor to the member to rotate it in the same direction as the rotor. However, since the ratchet 104*b* of the rotary member 104 is already engaged with the tip portion 105*a* of the claw 105 as shown in FIGS. 16, 17, 18 and 19, the rotary member cannot be rotated, namely, the rotor 103 cannot be reversely rotated any more. If the claw 105 is swung counterclockwise by the cam member 106 in advance, as shown in FIG. 20, so that the claw is disengaged from the ratchet 104*b*, the rotor 103 and the rotary member 104 can be reversely rotated continuously.

When the knob 119 is swung from a disengagement position ("OFF" position) shown by a full line in FIG. 20 to the engagement position ("ON" position) shown by a two-dot chain in line in FIG. 20, so that the tip portion 105*a* of the claw 105 is put on the tooth of the ratchet 104*b*, the spring 122 provided between the projection 108*b* of the secured member 108 and the cam member 106 at the arc-shaped recess 106*d* is once compressed to make it possible to swing the knob from the disengagement position to the engagement position.

The ratchet 104*b* and the claw 105 may be provided with notches and an engagement portion, respectively, in the same manner as the preceding embodiment.

FIG. 21 shows a reverse rotation prevention mechanism which is a modification of the embodiment shown in FIGS. 16, 17, 18, 19 and 20. In the mechanism, a cam member 106 has a groove 106*e* instead of a pin, a reverse rotation prevention engagement claw 105 has a pin 105*d* fitted in the groove.

Figure 23:
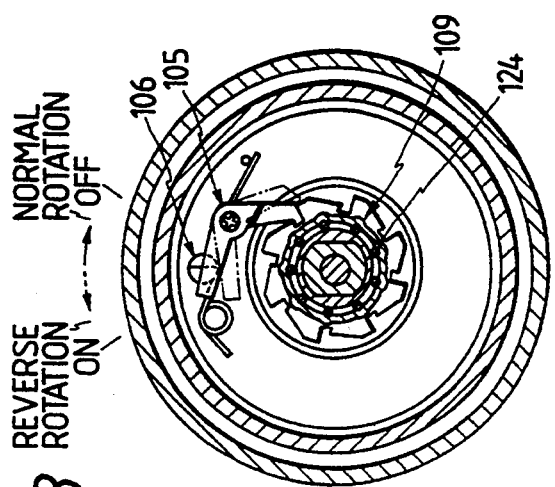
FIG. 23 is a sectional view of the mechanism along a line XXIII—XXIII shown in FIG. 22.
Figure 24:
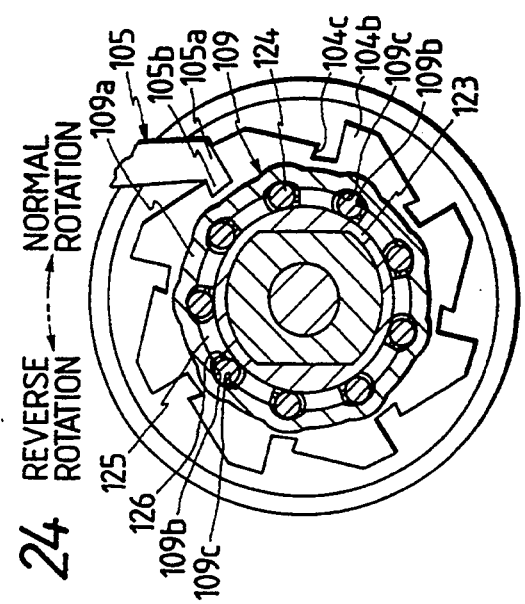
FIG. 24 is an enlarged sectional view of the mechanism along the line XXIII—XXIII of FIG. 22.
Figure 22:
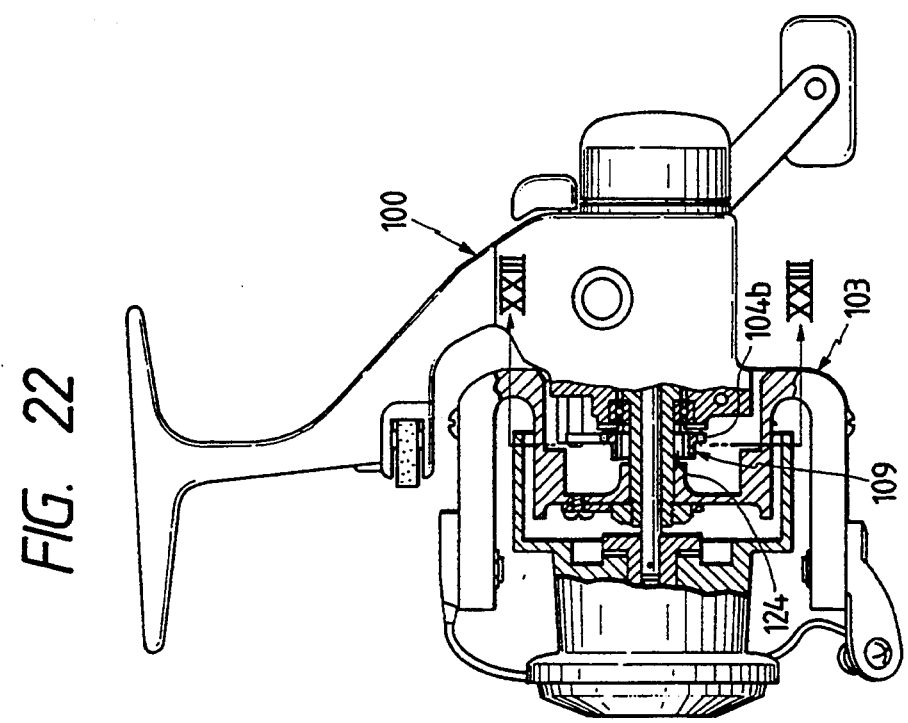
FIG. 22 is a partially sectional side view of a spinning reel which is for fishing and provided with a reverse rotation prevention mechanism which is a seventh embodiment of the present device.

FIGS. 22, 23 and 24 show a reverse rotation prevention mechanism which is the sixth embodiment and is for a spinning reel for fishing. Although the roller-type one-way clutch of the reverse rotation prevention mechanism shown in FIG. 12 includes the rotary member 104, the recesses 103*c*, the rollers 115 and the springs 107, that of the reverse rotation prevention mechanism shown in FIG. 22 includes a plurality of roller 124 fitted in the peripheral portion of a ring 123 fitted on the outside circumferential surface of a rotary quill 102, a rotary member 104 having a ratchet 104*b* having notches 104*c* and constituting the peripheral portion of the clutch, an outer ring 109*a*, recesses 109*b* provided in the inner circumferential portion of the outer ring, slopes 109*c* provided on the portion, spacers 125, and springs 126, as shown in FIGS. 23 and 24 The rollers 124 are kept at equal intervals by the spacers 125. The springs 126 urge the rollers 124 toward the slopes 109c.

When the rotary quill 102 of the fishing reel shown in FIG. 22 is turned clockwise with regard to FIG. 24, the rollers 124 of the roller-type one-way clutch 109 are pushed clockwise and located in the recess 109b of the outer ring 109a so that the quill can be smoothly rotated continuously. When the quill 102 is then reversely rotated counterclockwise with regard to FIG. 24, the rollers 124 are pushed counterclockwise and located in pressure contact with the slopes 109c of the outer ring 109a so that the quill and the rotary member 104 are kinematically connected to each other to transmit the torque of the quill to the rotary member through the outer ring to rotate the member in the same direction as the quill. In that case, the quill 102 and the rotary member 104 cannot be reversely rotated continuously if a reverse rotation prevention engagement claw 105 is engaged with the ratchet 104b of the rotary member, and the quill and the rotary member can be reversely rotated continuously if the claw is disengaged from the ratchet, similarly to the embodiment shown in FIG. 12. The engagement and disengagement of the claw 105 and the ratchet 105 are performed in the same manner as the embodiment shown in FIG. 12.

Although the embodiments described above are for the spinning reels, the present invention is not confined thereto but may be embodied for another type of a reel such as a reel whose spool shaft is supported at both the ends thereof. As for the embodiment for the other type of the reel, the above sentence "since the rotation speed of the rotor 103 has an influence, the ratchet 104b would be likely to be rotated in kinematic conjunction with the rotation of the rotor in the direction for the winding of the fishline." is replaced by a sentence "since the rotation speed of a spool has an influence, a ratchet would be likely to be rotated in kinematic conjunction with the rotation of the spool in the direction for the winding of a fishline or with the rotation of a drive member which is rotated in kinematic conjunction with the spool."

Figure 25:
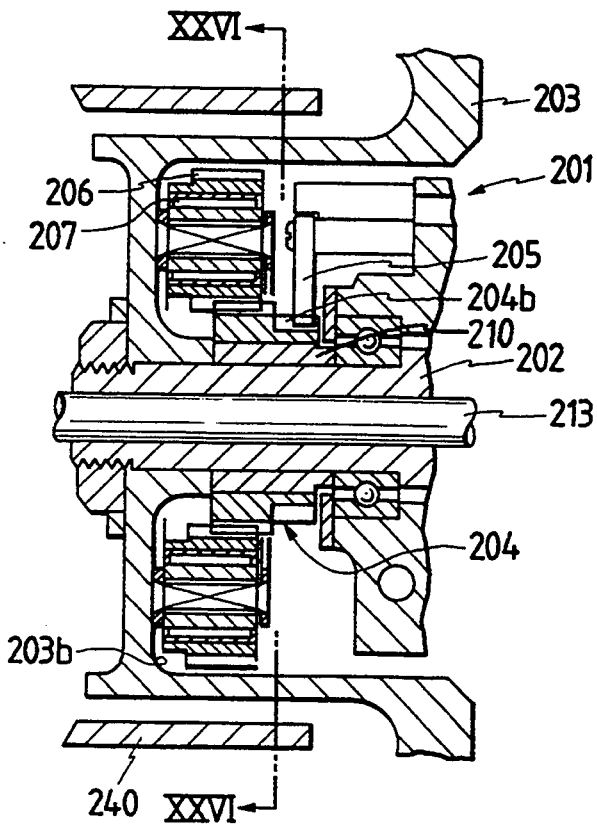
FIG. 25 is a partially sectional side view of a spinning reel which is for fishing and provided with a reverse rotation prevention mechanism which is an eighth embodiment of the present invention.
Figure 26:
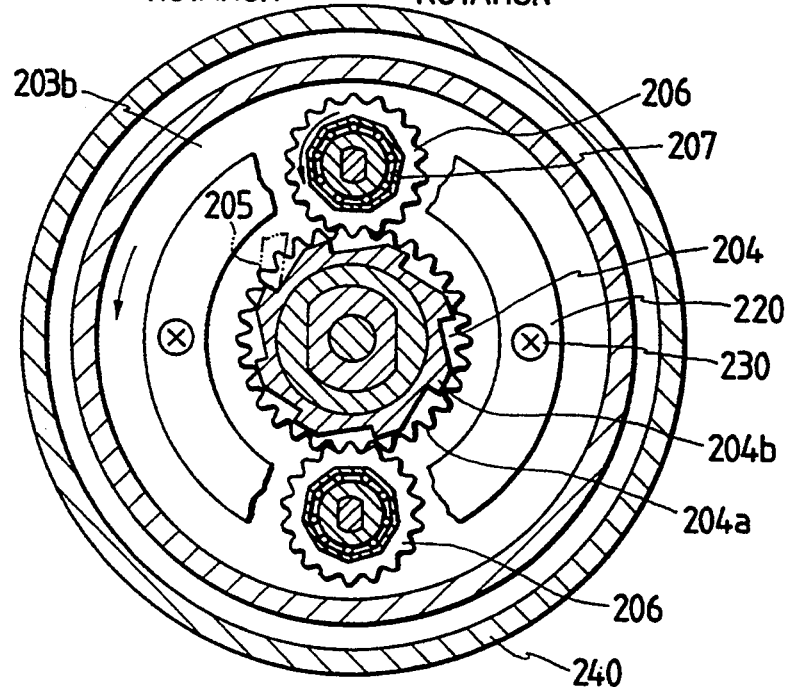
FIG. 26 is an enlarged sectional view of the reel along a line XXVI—XXVI shown in FIG. 25.

FIGS. 25 and 26 show a reverse rotation preventing mechanism which is the seventh embodiment and is in a spinning reel for fishing.

In this embodiment, each of clutch gears 206 which is fixedly secured to an outer peripheral surface of a roller-type one-way bearing 207 is pivotally supported to a bottom portion of a rotor 203b in parallel relation to a rotor quill 202. The clutch gears 206 are engaged with a gear portion 204a of a reverse rotation prevention member 204 which is rotatably supported to the rotor quill 202 through a collar 210. A reverse rotation prevention claw 205 can be engaged with one of the reverse rotation preventing engagement portions 204b which are provided to the member 204. The claw 205 is always urged by an urging means such as a spring member (not shown in the drawings) in such a direction as to engage the tip portion thereof with one of the engagement portions 204b when a fishline is wound on the spool. A clutch gear supporting member 220 is secured to the bottom portion 203b of the rotor 203 by a screw.

When a handle (not shown in the drawings) is turned in such a direction that the fishline is wound on the spool, the rotor 203 is rotated counterclockwise with regard to FIG. 26, and the clutch gears 206 pivotally supported to the bottom portion of the rotor 203b is rotated in kinematic conjunction with the rotor 203. At that time, since the pawl 205 is pressed to be engaged with one of engagement portions 204b of the reverse rotation preventing member 204 by the spring member, the member 204 is not rotated. In addition, clutch gears 206 are engaged with the gear 204a of the member 204 and the roller-type one-way bearing 207 can be rotated counterclockwise with regard to FIG. 26 so that the bearing 207 rotates on its axis and moves around a spool shaft 213. Therefore, the rotor 203 can be rotated when the fishline is wound on the spool.

When the fishline wound on the spool is then unwound therefrom by the pull of a fish, the rotor 203 is reversely rotated clockwise with regard to FIG. 26. At that time, the rotation of the clutch gears 206 in the clockwise direction is locked by the roller-type one-way bearing 207 so that the force for rotating the engagement portion 204b of the member 204 in the clockwise direction with regard to FIG. 26 is applied thereto. However, due to the engagement of the claw 205 with the member 204b, the reverse rotation preventing member 204 can not be reversely rotated any more. Therefore, the reverse rotation of the rotor 203 can be surely prevented.

Figure 27:
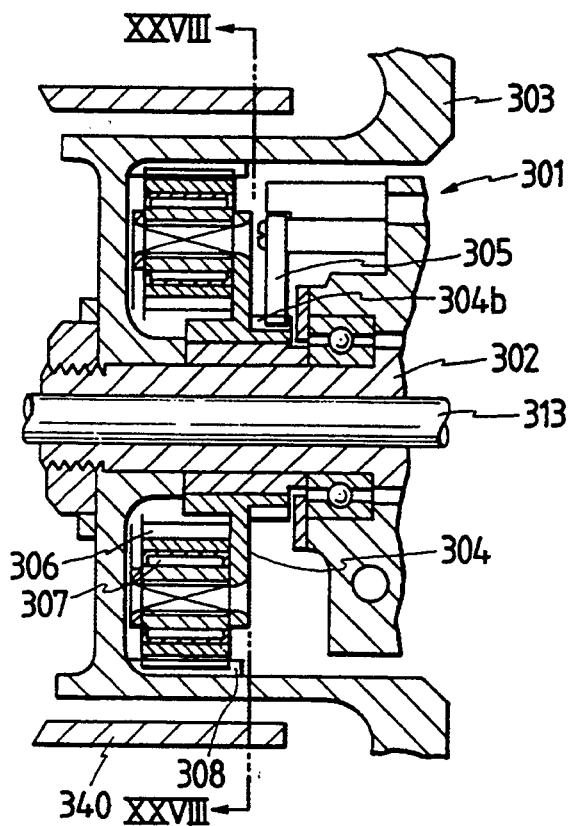
FIG. 27 is a partially sectional side view of a spinning reel which is for fishing and provided with a reverse rotation prevention mechanism which is a ninth embodiment of the present invention.
Figure 28:
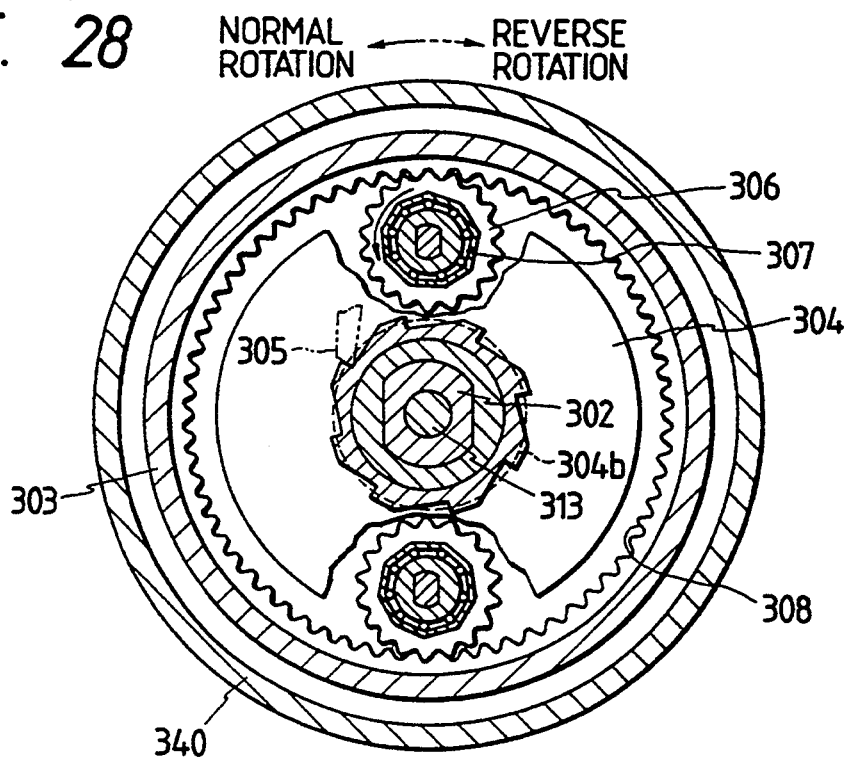
FIG. 28 is an enlarged sectional view of the reel along a line XXVIII—XXVIII shown in FIG. 27.

FIG. 27 and 28 show a reverse rotation preventing mechanism which is the eighth embodiment and is in a spinning reel for fishing.

In this embodiment, each of clutch gears 306 which is fixedly secured to an outer peripheral surface of a roller-type one-way bearing 307 is rotatably supported in a backward recess portion of the rotor 303 in parallel relation to a rotor quill 302. A reverse rotation prevention member 304 is rotatably supported on the rotor quill 302. Each of clutch gears 306 is engaged with the inner gear 308 provided to an inner peripheral surface of the rotor 303 and a reverse rotation preventing claw 305 is engaged with one of engagement portions 304b provided to the member 304.

When a handle (not shown) is turned in such a direction that the fishline is wound on the spool, the rotor 303 is rotated counterclockwise with regard to FIG. 27. At that time, clutch gears 306 engaged with the inner gear 308 rotate in its axis and the force for counterclockwise rotating the member 304 which supports clutch gears 306 around the spool shaft is applied to clutch gears 306. However, due to the engagement of the claw 305 with one of engagement portions 304b, the member 304 is not rotated. In addition, clutch gears 306 are engaged with the inner gear 308 provided to inner peripheral surface of the rotor 303 and the rotation of the bearing 307 in the counterclockwise direction is allowed so that each of clutch gears 306 rotates in its axis. Therefore, the rotor 303 can be rotated.

When the fishline wound on the spool is then unwound therefrom by the pull of a fish, the rotor 303 is reversely rotated clockwise with regard to FIG. 28. At that time, the rotation of each clutch gears 306 in the clockwise direction is locked by the roller-type one-way bearing 307 so that the force for rotating the engagement portion 304b of the member 304 which supports clutch gears 306 in the clockwise direction is applied thereto. However, due to the engagement of the claw 305 with one of the engagement portions 304b, the member 304 can not be reversely rotated. Therefore, the reverse rotation of the rotor 303 can be surely prevented.

In a reverse rotation preventing mechanism provided in accordance with the present device, in a spinning reel for fishing, since the roller-type one-way clutches are provided between the rotor and the reverse rotation prevention member, the engagement surfaces of the components of the mechanism are not to be locally loaded. Therefore, the durability of he engagement surfaces in the reverse rotation of the rotor can be enhanced and the high precision can be maintained in a long period. Besides, since the prevention member are provided to the reverse rotation prevention claw and a member corresponding to the claw, and the claw remains engaged with the ratchet without a clearance between them, the rotor is surely and instantaneously prevented from rotating reversely.

In addition, in the present invention, since the clutch member is provided within the limited space, that is, the space between the rotor and the reverse rotation prevention member, so as to utilize usefully there, the mechanism can be appropriate to a compact reel.

Further, according to the present invention, the weight of the construction becomes to be light and the manufacture cost can be reduced.

What is claimed is:

1. A reverse rotation preventing mechanism in a spinning reel for fishing, said reel being rotatable in a forward direction to wind a fishline thereon and a reverse direction to unwind said fishline, said reel comprising:
    a rotor quill rotatably supported by a spool shaft, said rotor quill being rotated by the turning of a handle in kinematic conjunction therewith;
    a rotor secured to said rotor quill;
    a reverse rotation prevention member having engagement portions for preventing rotation in said reverse direction, said reverse rotation prevention member being rotatably supported concentrically to said rotor quill;
    a reverse rotation prevention claw supported by a reel body so as to be swingable, said reverse rotation prevention claw being able to be engaged with one of said reverse rotation engagement portions to prevent rotation thereof; and
    a clutch means provided between said rotor and said reverse rotation prevention member for allowing said rotor to rotate only in one direction, said clutch means being disposed radially outside of said reverse rotation prevention member with respect to an axis of said rotor quill, wherein said clutch means connects said rotor to said reverse rotation prevention member, when said rotor is rotated in said reverse direction.

2. A reverse rotation preventing mechanism according to claim 1, wherein said clutch means is comprised of roller-type one-way clutches.

3. A reverse rotation preventing mechanism according to claim 2, further comprising a control means for controlling said reverse rotation prevention claw so as to be engaged with or disengaged from one of said reverse rotation engagement portions.

4. A reverse rotation preventing mechanism according to claim 2, wherein said roller-type one-way clutches are provided between a clutch recess portion of said rotor and a portion of said reel body between said handle and said spool, and is rotatably supported concentrically to said rotor quill.

5. A reverse rotation preventing mechanism according to claim 2, further comprising a means for preventing said reverse rotation prevention claw from being disengaged from one of said reverse rotation engagement portions in the case where said reverse rotation prevention member is rotated in said reverse direction.

6. A reverse rotation preventing mechanism according to claim 5, wherein said prevention means is comprised of a spring member which resiliently urges said reverse rotation prevention claw so as to engage with one of said engagement portions.

7. A reverse rotation preventing mechanism according to claim 1, wherein said clutch means is comprised of clutch gears which are rotatably provided between a clutch recess portion of said rotor and said rotor quill.

8. A reverse rotation preventing mechanism according to claim 7, wherein each of said clutch gears has a one-way roller bearing and is fixedly secured to an outer peripheral surface of said bearing.

9. A reverse rotation preventing mechanism in a fishing reel, comprising:
    a reel casing;
    a rotary quill adapted to transmit a rotational torque from a first member to a second member and to rotate relative to said reel casing;
    said first member non-rotatively fitted on said rotary quill to rotate together with said rotary quill and formed with a first surface;
    said second member rotatably fitted on said rotary quill and formed with a second surface radially located inside relative to said first surface with respect to an axis of said rotary quill;
    a rolling member provided between said first and second surfaces;
    first means for interlocking said rolling member with said first and second surfaces so that said first and second members are prevented from being rotated together when said rotary quill is rotated in a first direction and permitting a mutual rotation between said first and second members when said rotary quill is rotated in a second direction opposite to said first direction; and
    second means for selectively preventing said second member from being rotated relative to said reel casing.

10. The reverse rotation preventing mechanism according to claim 9, wherein said second means includes an engagement wheel provided in said second member and adapted to be engaged with an engagement claw provided in said reel casing.

11. A one-way clutch adapted to be incorporated in a reverse rotation preventive mechanism in a fishing reel having a rotary quill, said one-way clutch comprising:
    a first member adapted to be non-rotatively fitted on said rotary quill to rotate together with said rotary quill and formed with a first surface;
    a second member adapted to be rotatably fitted on said rotary quill and formed with a second surface radially located inside relative to said first surface with respect to an axis of said rotary quill;
    a rolling member provided and held between said first and second surfaces; and
    first means for preventing said first member from rotating in a first direction relative to said second member and permitting said first member to rotate relative to said second member in a second direction opposite to said first direction, wherein said second member is formed with an engagement portion adapted to be engaged with an engagement claw provided in said fishing reel.

* * * * *